United States Patent
Mahaney et al.

(10) Patent No.: US 6,323,433 B1
(45) Date of Patent: Nov. 27, 2001

(54) CONNECTOR GROMMET

(75) Inventors: John T. Mahaney, Williamstown; Dejan Radosavljevic, LaFayette; Michael A. Helms, Clay, all of NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 09/306,747

(22) Filed: May 7, 1999

(51) Int. Cl.⁷ ..................................................... H01B 17/30
(52) U.S. Cl. ................................... 174/152 G; 174/65 G; 174/151; 174/167
(58) Field of Search .................... 174/65 R, 65 G, 174/65 SS, 151, 153 R, 153 G, 152 G, 167

(56) References Cited

U.S. PATENT DOCUMENTS

| | | | |
|---|---|---|---|
| 3,248,135 | * | 4/1966 | Meripol ................................. 285/323 |
| 3,708,780 | * | 1/1973 | Pierce ..................................... 339/176 |
| 4,350,840 | | 9/1982 | Michaels . |
| 4,385,453 | * | 5/1983 | Withers, Jr. et al. .................. 34/110 |
| 4,481,697 | | 11/1984 | Bachle . |
| 4,786,397 | | 11/1988 | Barbieri et al. . |
| 4,839,937 | * | 6/1989 | Oikawa et al. .................. 174/152 G |
| 4,921,031 | | 5/1990 | Wagner et al. . |
| 4,945,193 | | 7/1990 | Oikawa et al. . |
| 4,966,374 | | 10/1990 | Oikawa et al. . |
| 5,123,862 | * | 6/1992 | Suzuki ................................. 439/533 |
| 5,147,222 | | 9/1992 | Hotea et al. . |
| 5,410,104 | | 4/1995 | Gretz et al. . |
| 5,543,582 | | 8/1996 | Stark et al. . |
| 5,567,174 | | 10/1996 | Ericson, Jr. et al. . |
| 5,696,493 | | 12/1997 | Einck . |
| 5,731,543 | | 3/1998 | Jorgensen . |
| 6,194,659 | * | 2/2001 | Cornu ................................. 174/65 R |

* cited by examiner

Primary Examiner—Dean A. Reichard
Assistant Examiner—Adolfo Nino
(74) Attorney, Agent, or Firm—Wall Marjama & Bilinski, LLP

(57) ABSTRACT

A one piece grommet for accommodating a variety of wire sizes in an operable environment to substantially preclude travel of environmental parameters along a length of the wire passing the grommet is disclosed. The grommet has an outer annulus and a radially inwardly spaced inner annulus, connected by a neck, wherein the outer annulus has a sufficient rigidity to substantially preclude inversion of the grommet upon translation of the wire in an axial direction.

11 Claims, 3 Drawing Sheets

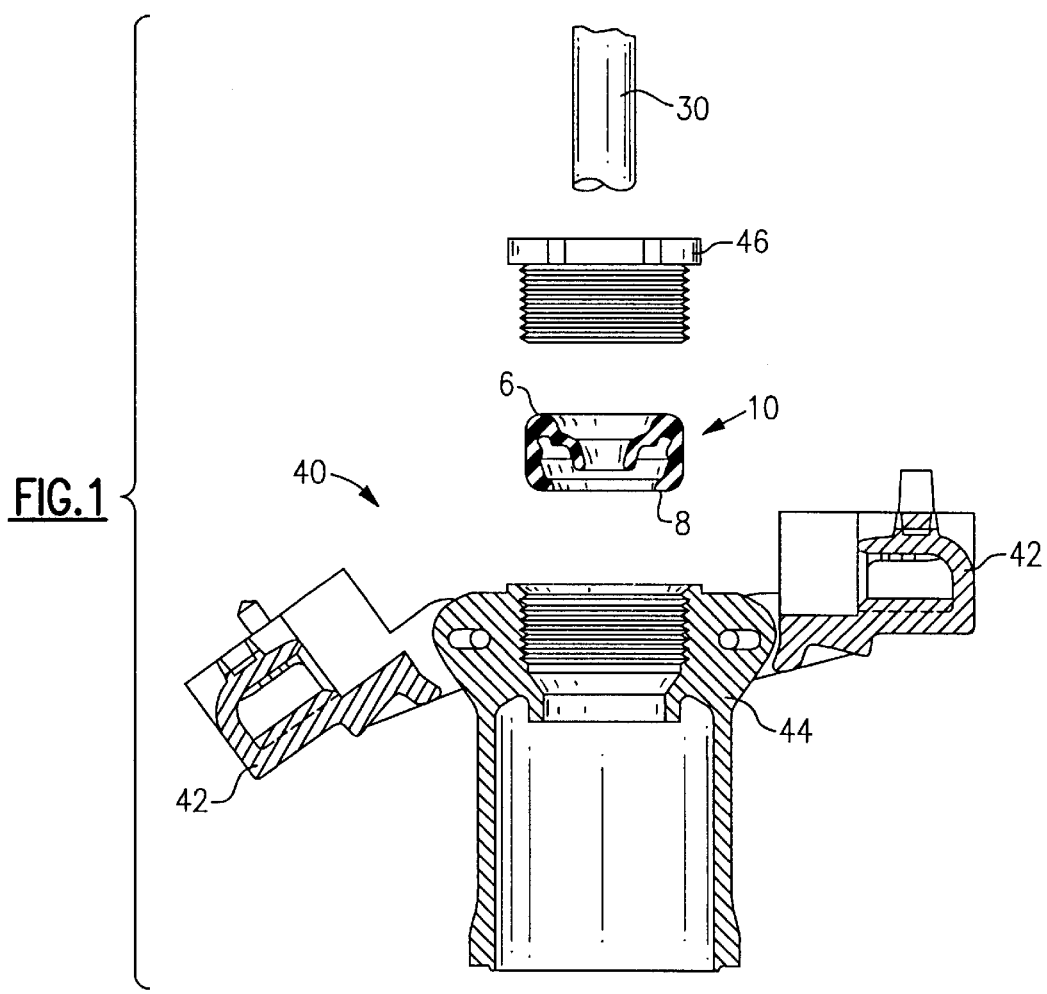
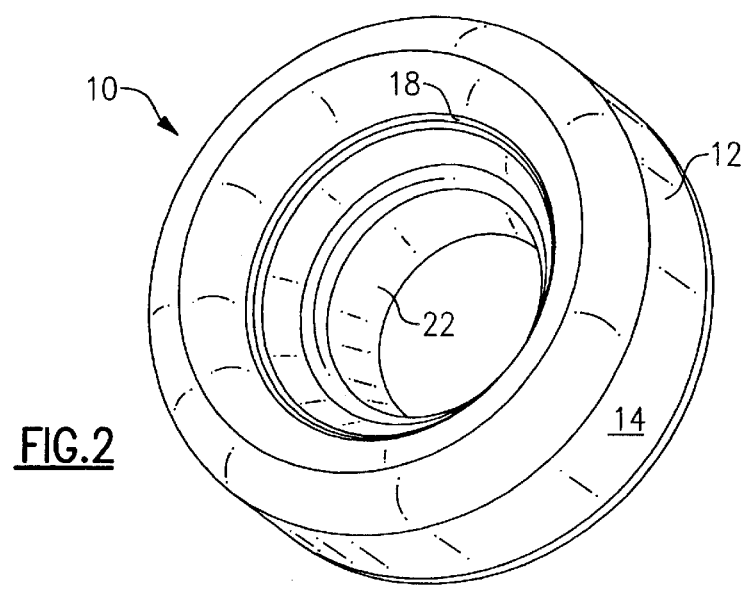

CONNECTOR GROMMET

FIELD OF THE INVENTION

The present invention relates to mechanical interconnect structures, and more particularly, to a grommet for engaging any of a plurality of wire or cable diameters to provide a substantially sealed interface between the wire or cable and an interconnected structure.

BACKGROUND OF THE INVENTION

Wire and cable often require connection to other electrical components including connectors and plugs. A connection to the wire or cable may require a water tight seal. That is, the migration of water or debris along the length of the wire into the electrical device may jeopardize functioning of the electrical device.

Prior systems have employed seals or grommets sized to a particular wire or cable diameter. Similarly, various grips and strain relief mechanisms for cords, particularly, electrical cords employ a grommet that is compressed about an adjacent section of the cord. In a preferred construction, these grips are able to provide a sealing engagement with respect to the cord.

However, in each of these constructions, the grommet is sized to a particular cord size, Thus, where the specific grommet size is not available, assembly delays are encountered. Further, if the applied grommet is mis-sized, the necessary sealing functions may not be performed.

Therefore, a need exists for a mechanical interconnect structure for wire or cable systems that can provide a weather resistant seal. A need exists for such structure to be satisfied by a grommet. The need also exists for a grommet that can accommodate any of a variety of wire sizes.

SUMMARY OF THE INVENTION

The present invention provides a grommet for a weather resistant interface in a mechanical interconnect structure. The present grommet inhibits the travel of moisture and debris from a length of wire. Preferably, the grommet is selected to provide a water tight seal to the wire.

The grommet of the present invention includes an outer seating annulus sized to contact an inner diameter of a connector; an inner sealing annulus sized to contact an outer diameter of a wire passing through the grommet and a neck extending between the outer annulus and the inner annulus to locate the inner annulus substantially within the outer annulus.

In a preferred construction, the inner annulus has a reduced thickness compared to the outer annulus so as to accommodate a variety of wire outer diameters. Further, the neck may include, or be formed, with a lubricant to assist passage of the wire through the inner annulus. In an additional configuration, the outer annulus, the inner annulus and the neck are of an integral one piece construction.

BRIEF DESCRIPTION OF THE DRAWINGS

FIG. 1 is an exploded side elevational view in partial cross section showing the grommet in operable alignment in a connector.

FIG. 2 is a front perspective view of the grommet.

DETAILED DESCRIPTION OF THE PREFERRED EMBODIMENTS

Figure 3:
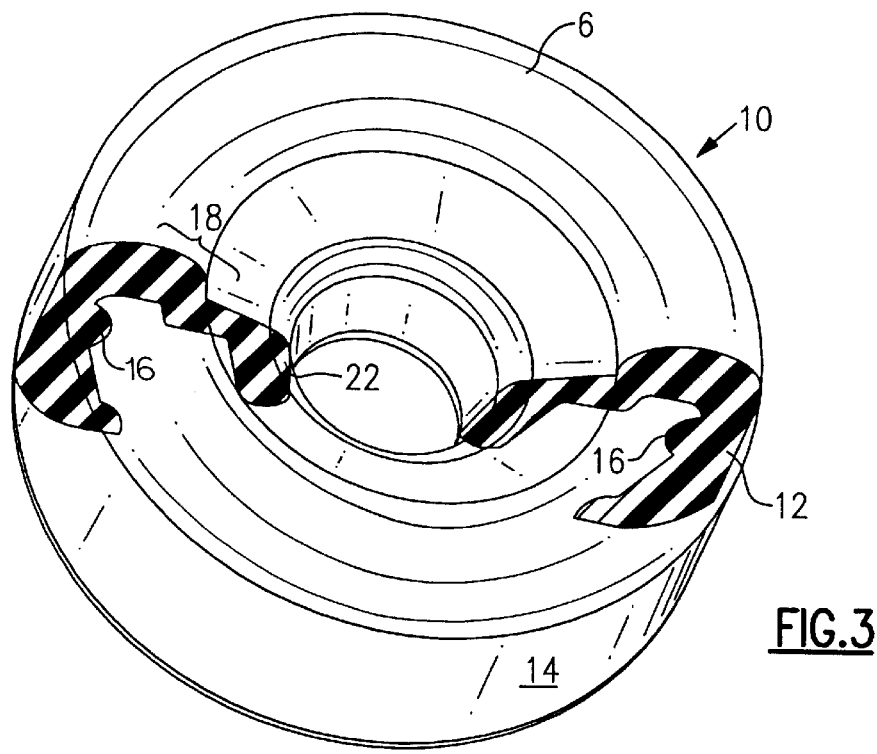
FIG. 3 is a front perspective view of the grommet with a cut away portion showing the profile of the grommet.

Referring to FIG. 1, a grommet 10 according to the present invention is operably employed in a plug, receptacle or connector assembly for engaging an elongate cylindrical element such as a cord, wire or cable (wire) 30. For purposes of clarity, the grommet 10 is described in connection with a plug 40 having a plug body 42, a back body 44, and a compression nut 46. However, it is understood the grommet may be used in conjunction with any of a variety of interconnect structures such as receptacles, connectors and plugs.

Generally, as shown in FIG. 1, the plug body 42, the back body 44, the grommet 10 and the compression nut 46 include an aperture therethrough. The wire 30 is passed through the aperture in each component and the plug is assembled about the wire to resist unintentional separation. The compression nut 46 threadingly engages the back body 44 to retain the grommet 10 therebetween. The grommet thus forms an interface between the plug 40 and the wire 30.

Figure 4:
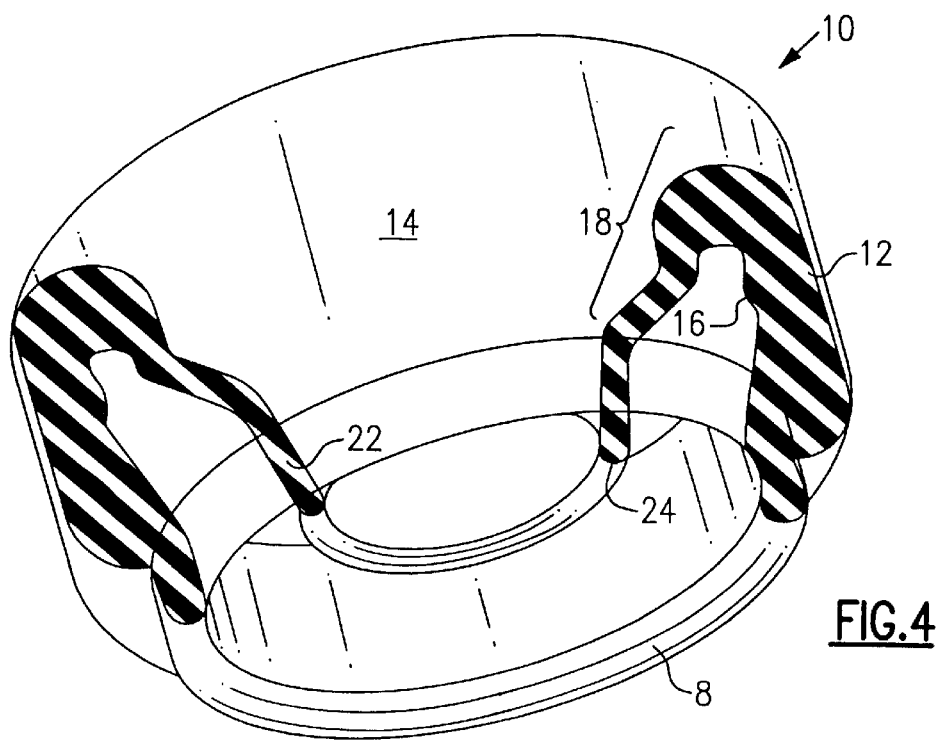
FIG. 4 is a rear perspective view of the grommet with a cut away portion showing the profile of the grommet.
Figure 5:
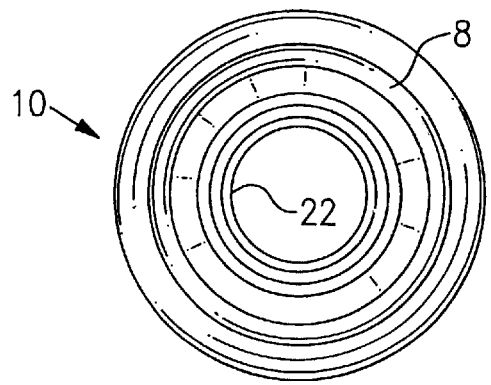
FIG. 5 is a bottom plan view of the grommet.
Figure 6:
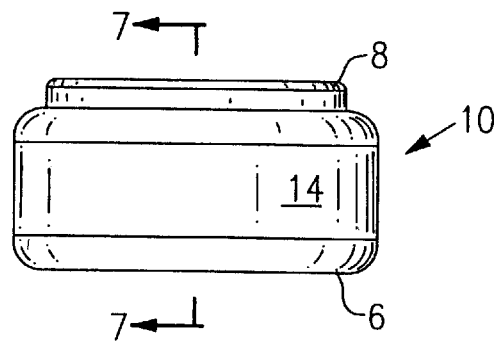
FIG. 6 is a side elevational view of the grommet.
Figure 7:
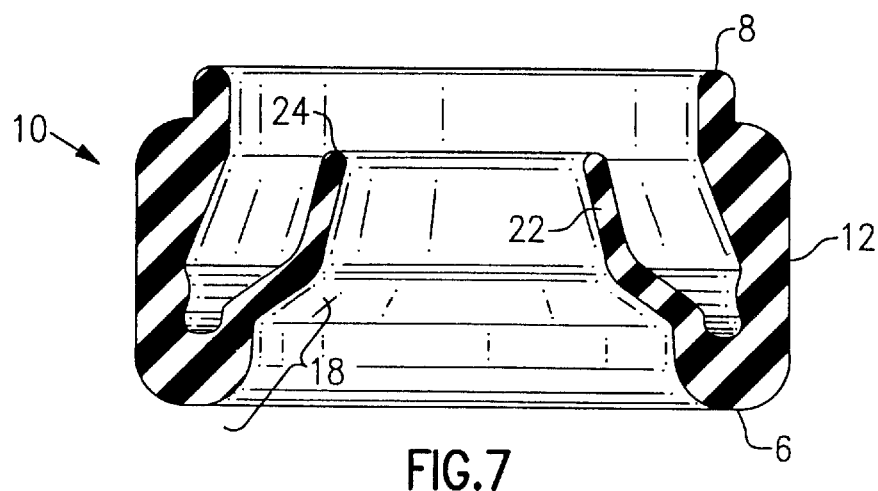
FIG. 7 is a cross sectional view of the grommet taken along lines 7—7 of FIG. 6.

Referring to FIGS. 1–7, the grommet 10 includes an outer seating annulus 12, an inner sealing annulus 22 and a neck 18 extending from the outer annulus to the inner sealing annulus. The grommet 10 has an upstream end 6 which first engages the wire 30 and a downstream end 8 from which the wire extends. That is, during operable engagement with a length of wire 30, the upstream end 6 of the grommet 10 first contacts the wire. The grommet thereby defines an axial direction from the upstream end 6 to the downstream end 8. Preferably, the grommet 10 is an integral, one piece member formed of a highly elastic material such as neoprene.

The outer annulus 12 is sized to seat on a corresponding portion of the plug 40. The outer annulus 12 extends along the axial direction from the upstream end 6 to the downstream end 8. The outer annulus 12 defines a continuous outer surface 14 for engaging the plug. The outer annulus 12 includes radially inward extending reinforcing rib 16. The reinforcing rib 16 is sized to provide rigidity to the grommet. The reinforcing rib 16 extends inward to terminate at a free end. The free end has a diameter that is greater than the inner annulus 22 and less than the outer annulus 12. The outer annulus 12 is constructed with a sufficient axial dimension and radial thickness to substantially preclude inversion of the grommet 10 as the wire 30 is drawn into the grommet 10 or withdrawn from the grommet.

The neck 18 is connected to the upstream end of the outer annulus 12 and the upstream end of the inner sealing annulus 22. The neck 18 defines a radiused surface at the connection to the outer annulus 12. The neck 18 defines a generally funnel or frustoconical shape as it extends from a flared end at the outer annulus 12 to a constricted end at the inner annulus 22. The neck 18 includes a generally V-shaped portion having a relatively large thickness. The thickness of the V-portion assists in precluding inversion of the grommet 10 as the wire 30 is drawn into the grommet or withdrawn from the grommet. The neck 18 has substantially the same thickness as the outer annulus 22 at the junction with the outer annulus and has substantially the same thickness as the inner sealing annulus at the junction with the inner sealing annulus. The neck 18 is generally decreasing thickness as it extends from the outer annulus 12 to the inner annulus 22.

It is contemplated the neck 18 may include or be formed with a lubricant to promote initial passage of the wire 30 through the grommet 10.

The inner sealing annulus 22 is located at the constricted end of the neck 18 and has a smaller diameter than that of the outer annulus 12. The inner annulus 22 is axially located between the upstream end 6 and the downstream end 8 of the outer annulus 12.

In a preferred construction, the inner annulus 22 is thinner than the outer annulus 12. Specifically, the inner annulus 22 has a thickness in the radial direction which is less than the thickness of the outer annulus 12 in the radial direction.

The inner annulus 22 may be generally a cylindrical shape starting at the end of the constricted end of the neck 18 and terminating at a free end 24. The inner annulus 22 and neck 18 are sized to locate the axial dimension of the inner annulus between the upstream end and the downstream end of the outer annulus 12.

However, it is contemplated that the inner annulus 22 may be slightly tapered so as to be frustoconical or funnel shaped. The taper of the inner annulus 22 is selected to be different than that of the neck 18. The inner annulus 22 defines a thickness that is slightly greater than that of the neck 18.

The inner annulus 22 and neck 18 are formed of a thickness to sufficiently stretch to accommodate 14 to 10 gauge wires 30.

Referring to FIG. 1, in operation, the wire is passed through the compression nut 46 and the lead end of the wire is then passed to the upstream end of the grommet 10. The lead end of the wire 30 contacts or is guided by the neck 18 to be directed to the inner annulus 22. A desired length of wire 30 is passed through the grommet 10 to extend beyond the free end of the inner annulus 22. The grommet 10 is then seated on a corresponding surface of the plug body 40 and the compression nut 46 is threaded into corresponding threads.

The grommet 10 is generally sized to accommodate the inner diameter of the receptacle body, wherein the inner diameter of the grommet, is determined by the neck 18 and the inner annulus, and may accommodate any of a variety of wire sizes within a predetermined range.

Preferably, the grommet 10 is selected such that the inner annulus 22 is, at least, slightly stretched upon passing the wire 30 through the grommet. The resilient nature of the inner annulus 22 causes the grommet 10 to seat and seal against the wire 30. Thus, the grommet 10 substantially precludes environmental elements, such as water, dust or debris from migrating along the wire 30 as the wire passes through the grommet.

In those instances where a lubricant is applied to the neck 18, the lubricant enhances passage of the wire 30 through the grommet 10.

The grommet 10 is configured to provide a water tight seal to the wire 30. That is, under normal operating parameters migration of fluid along the wire is precluded by the grommet 10. In fact, the grommet 10 meets the IP-67 European submersion standard.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A plug and connector grommet, comprising:

(a) a resilient outer annulus;

(b) a resilient inner annulus, wherein the outer annulus and inner annulus each have first and second rims; and (c) a resilient neck extending between the outer annulus and the inner annulus to locate the inner annulus within the outer annulus, such that both planes defined by the rims of the inner annulus are bounded by both planes defined by the rims of the outer annulus;

wherein the first rim of the outer annulus and the first rim of the inner annulus are joined by the neck but the second rim of the outer annulus and the second rim of the inner annulus are unjoined.

2. The grommet of claim 1, wherein the inner annulus, the outer annulus, and the neck are an integral one piece member.

3. The grommet of claim 1, wherein the inner annulus is cylindrical.

4. The grommet of claim 1, wherein the inner annulus is tapered.

5. The grommet of claim 1, wherein the inner annulus is frustoconical.

6. The grommet of claim 1, wherein the outer annulus has a first axial dimension and the inner annulus has a second smaller axial dimension.

7. The grommet of claim 1, wherein the outer annulus has a first thickness and the inner annulus has a second smaller thickness.

8. A plug and connector grommet, comprising:

a resilient outer annulus;

a resilient inner annulus;

a neck extending between the outer annulus and the inner annulus to locate the inner annulus within the outer annulus; and a reinforcing rib extending radially inward from the outer annulus.

9. The grommet of claim 1, wherein the reinforcing rib has an inner diameter greater than the inner annulus and less than the outer annulus.

10. A grommet for sealing a passage between a cable and a hole of a structure said cable passes through, comprising:

an outer sealing annulus;

an inner sealing annulus;

a neck extending from said outer sealing annulus to said inner sealing annulus; and means for substantially precluding inversion of said grommet as said cable is drawn into said grommet and withdrawn from said grommet.

11. A grommet for sealing a passage between a cable and a hole of a structure said cable passes through, comprising:

an outer sealing annulus;

an inner sealing annulus; and means connecting said inner sealing annulus to said outer sealing annulus for permitting said grommet to flex to effectively seal different size cables passing through said structure.

* * * * *